June 23, 1959 — T. J. KOLESA — 2,891,486
RAILWAY VEHICLE BODY AND TRUCK ASSEMBLY
Filed Oct. 22, 1956 — 2 Sheets-Sheet 1

INVENTOR
THOMAS J. KOLESA
BY Rodney Bedell
ATTORNEY

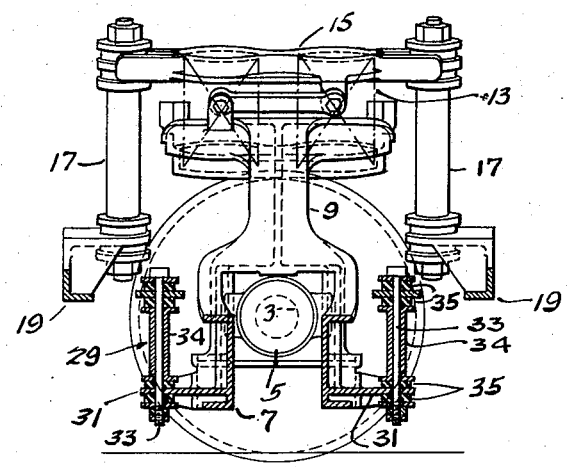

United States Patent Office 2,891,486
Patented June 23, 1959

2,891,486

RAILWAY VEHICLE BODY AND TRUCK ASSEMBLY

Thomas J. Kolesa, Granite City, Ill., assignor to General Steel Castings Corporation, Granite City, Ill., a corporation of Delaware Application October 22, 1956, Serial No. 617,337

9 Claims. (Cl. 105—199)

The invention relates to railway rolling stock and more particularly to truck and vehicle body assembly structure adapted to avoid the effect of braking torque tending to tilt or overturn the frame of a two-wheel truck.

The main object of the invention is to transmit the braking torque from the truck frame to the vehicle body frame independently of the spring support of the body upon the truck frame and independently of the linkage whereby the truck is swiveled to the body.

Another object is to avoid interference between truck and body connecting structure and provide more clearance between truck and body parts than in earlier arrangements of two-wheel trucks of the general type illustrated.

In the accompanying drawings illustrating a selected embodiment of the invention:

Figure 3 is a vertical longitudinal section on line 3—3 of Figure 2.

Figure 4 is a detail vertical longitudinal section on line 4—4 of Figure 2.

Figure 5 is a detail vertical longitudinal section on line 5—5 of Figure 2.

Figure 1:
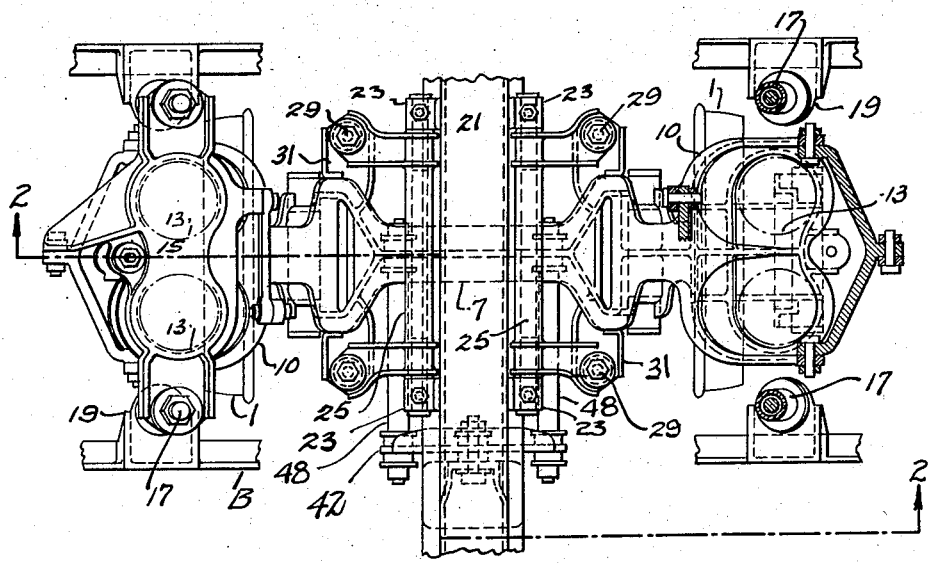
Figure 1 is a top view of a two-wheel truck, a portion being sectioned horizontally. The view is taken upon line 1—1 of Figure 2.
Figure 2:
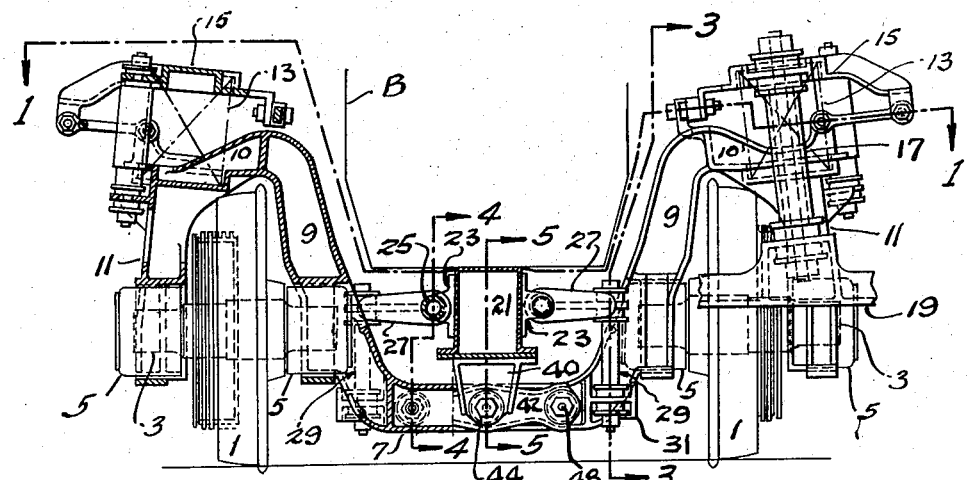
Figure 2 is, in part, an end elevation and, in part, a transverse vertical section on line 2—2 of Figure 1.

The truck illustrated comprises the usual wheels 1 mounted on stub axles 3 which are journaled in boxes 5 seated in the truck frame. The truck frame comprises a low level intermediate portion 7 merging with upwardly extending portions 9. Upper level transverse portions 10 extend outwardly from the upper ends of portions 9 and merge with downwardly extending end portions 11. Portions 9, 10, 11 form inverted U-shaped structures receiving the journal boxes and forming seats for coil springs 13 arranged in pairs. A spring cap 15 is seated upon each pair of springs 13. Hangers 17 swing from the ends of caps 15 and at their lower ends support the vehicle body B through brackets 19.

The general arrangement of the truck and body supporting parts corresponds to that shown in a co-pending application filed by R. L. Lich, June 6, 1955, Serial No. 513,234.

The vehicle body framing includes a box section center sill 21 each side of which is provided with brackets 23 spaced apart a substantial distance lengthwise of the vehicle. A trunnion 25 is journaled in each pair of brackets 23 and is provided with arms 27 fixed to the trunnion and extending laterally therefrom toward the sides of the vehicle. Anchors 29 depend from the outer ends of arms 27 and are connected at their lower ends to brackets 31 provided on the adjacent portion of the truck frame. Each anchor 29 is of a form in common use in railway vehicles and comprises a central bolt-like element 33 (Figure 3) surrounded by a sleeve 34 forming a strut between the parts connected by the anchor. Rubber pads 35 are clamped between the adjacent ends of the strut and bolt so that the interconnected parts may angle transversely of the anchor axis to accommodate relative lateral and swiveling movements of the body and truck, as may be initiated by the truck passing from curved to tangent track or vice versa, or by other forces exerting lateral thrusts on the truck and body in opposite directions, but the interconnected parts are held against relative movement lengthwise of the axis.

Spaced lengthwise of the vehicle from the truck frame is a center sill bracket 40, the lower portion of which is at the same level as the intermediate low level portion 7 of the truck frame. A horizontal cross bar 42 is mounted on the lower end of bracket 40 by a bolt 44 and resilient washers 46 (Figure 5). Anchors 48, constructed similar to anchors 29, extend lengthwise of the vehicle from each end of cross bar 42 and at their remote ends are connected to the truck frame low level intermediate portion 7. These anchors 48 accommodate relative lateral and swiveling movements of the truck and vehicle body. Anchors 48 also accommodate relative vertical movements of the truck and vehicle body due to the action of truck springs 13.

With this construction there is no substantial restriction between such necessary relative movements between the body and truck frame, but because of the parallelism of the vertical anchors 29 and the rigidity of the pivoted trunnions 25 to which they are secured, tilting of the truck longitudinally of the car due to braking, acceleration or deceleration or other causes is prevented. There is ample clearance between the truck structure and the vehicle body and there is no necessity of a centering linkage extending from one side of the center sill to the other, as is used in the two-wheel truck and body assembly of the above mentioned application.

While the trunnion 25 and anchor devices 29 are provided at each side of the center sill, one of these trunnions and the connected anchors 29 could be eliminated. Similarly, a single longitudinal anchor could be substituted for the spaced anchors 48. These changes, and other variations in structure may be made without departing from the spirit of the invention and the exclusive use of such modifications as come within the scope of the claims is contemplated.

What is claimed is:

1. In combination with a railway vehicle truck, including a frame, and a vehicle body spring-supported thereon and including a center sill, a trunnion extending lengthwise of said body and journaled thereon and having laterally extending arms fixed thereon near its ends spaced forwardly and rearwardly from said truck frame, the truck frame having brackets extending beneath said arms and spaced substantially below the center sill, substantially upright links with their ends flexibly connected to said arms and brackets and holding the truck frame against tilting in a vertical plane extending longitudinally of the vehicle body but yielding transversely of their length during horizontal swiveling of the truck frame relative to the body, said trunnion and its arms rotating about its axis during relative vertical movement of the body and truck due to the body supporting-spring action.

2. A railway vehicle structure according to claim 1 in which an elongated anchor device extends lengthwise of the vehicle with one end flexibly connected to the truck frame and its other end flexibly connected to the vehicle body and holding the truck frame against relative movement lengthwise of the body while yielding transversely of its length during relative vertical movement of the body and truck frame and horizontal swiveling movement.

3. In combination with a railway vehicle body frame and a truck supporting the same and including a truck frame, a pair of elongated anchors extending longitudinally of the vehicle and spaced apart transversely of the vehicle, each anchor being pivotally connected at one end to the truck frame, a cross bar pivotally connected at its ends to the other ends of said anchors, and a bolt between the middle of said cross bar and the body frame, said anchors holding the cross bar and body frame against relative movement lengthwise of the body, cross bar and bolt having yielding joints with interconnecting parts forming a parallel linkage and comprising a swiveling connection between said frames yielding during angling of the bar to the body frame and swiveling of the truck frame horizontally relative to the body frame.

4. In combination with a railway vehicle truck, having a frame, and a vehicle body underframe, having a center sill, spring-supported on the truck frame, an elongated member journaled on the body underframe at points spaced lengthwise thereof and having arms at its ends extending outwardly from the center sill, upright links pivoted to the ends of said arms and to the truck frame, the elongated member rotating in its journals during relative vertical movement of the body frame and truck frame because of support spring action, said links holding the truck frame against tilting vertically lengthwise of the body but swinging about their connections to said arms and the truck frame during relative movement of the frames transversely of the vehicle.

5. In the combination of a railway vehicle truck and a vehicle body supported thereon, a truck frame comprising a single main transverse member provided with spring seats at its outer ends, springs on said seats, links depending from the springs and supporting the sides of the vehicle body, the vehicle body having a center sill, a trunnion extending alongside said center sill and journaled thereon and having laterally extending arms forwardly and rearwardly from said truck frame main member, individual brackets on said member extending therefrom beneath said trunnion arms, and upright links pivotally connected to corresponding arms and brackets on the center sill and truck frame respectively and holding the truck frame against tilting lengthwise relative to the body.

6. A railway vehicle structure according to claim 4 which includes an elongated device pivotally connected at one end to the truck frame and at its other end to the vehicle center sill and angling relative to the truck frame and center sill during swiveling of the truck and body relative to each other but holding them against relative movement longitudinally of the vehicle.

7. A railway vehicle structure according to claim 6 in which the last mentioned device comprises a rod alongside of the body center sill and flexibly anchored at one end to the truck frame and at its opposite end flexibly anchored to the body center sill.

8. In combination with a railway vehicle truck, including a frame, and a vehicle body underframe spring-supported thereon and including a center sill, a pair of brackets extending laterally from each side of the center sill and spaced apart lengthwise of the center sill, a trunnion extending lengthwise of said body and journaled in each pair of brackets and having arms near its ends projecting toward the adjacent side of the vehicle, the truck frame having a middle portion beneath the body underframe center sill and beneath the level of the arms at the ends of said trunnion, and substantially upright links depending from the ends of said arms and pivotally connected thereto and to said truck frame portions so as to yield angularly at their connections during swiveling of the truck relative to the vehicle body while holding the truck frame against vertical tilting lengthwise of the vehicle, the end portions of the truck frame projecting upwardly above the level of said arms and center sill and outwardly therefrom, body frame supporting means carried by said truck frame end portions, and elongated members extending lengthwise of said underframe center sill at opposite sides thereof and each having an end pivotally connected to the center sill and an end pivotally connected to the truck frame middle portion for positioning the truck longitudinally of the vehicle.

9. In combination with a railway vehicle truck frame and a vehicle body spring-supported thereon, the truck frame being rigid from side to side of the truck and mounting journal boxes, there being wheeled axles journaled in said boxes, said vehicle body having a center sill, a cross bar spaced lengthwise of the vehicle from the truck frame and having a single resilient pivot intermediate its ends to the body center sill, elongated anchor rods at the sides of the body center sill each having a single resilient pivot at one end to the center sill and at its other end to an end of said cross bar, said cross bar, anchor rods and connections yielding to relative vertical, lateral and swiveling movements of said body and truck but holding them against relative movements longitudinally of the vehicle.

References Cited in the file of this patent
UNITED STATES PATENTS

| | | |
|---|---|---|
| 981,131 | Spangler | Jan. 10, 1911 |
| 2,268,267 | Sheesley | Dec. 30, 1941 |